March 5, 1963  A. E. MARTIN  3,079,834
SPECTROMETERS
Filed June 28, 1955
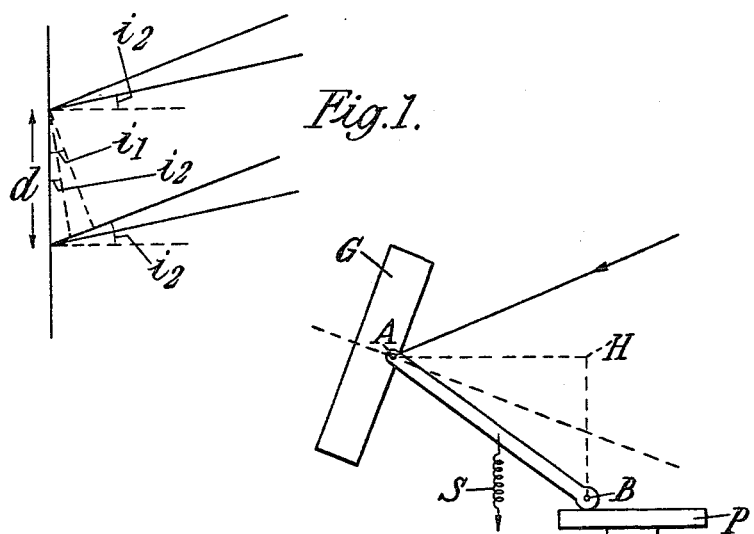
Fig.1.
Fig.2.
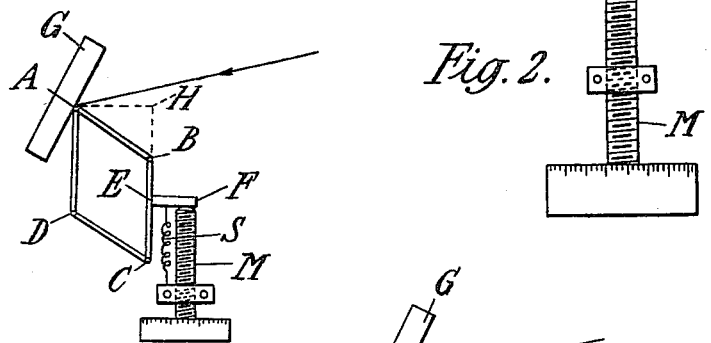
Fig.3.
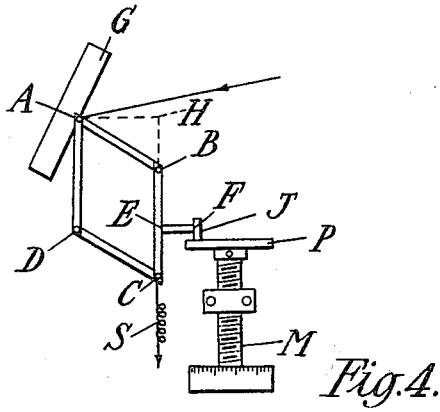
Fig.4.

3,079,834
SPECTROMETERS
Albert E. Martin, Newcastle-upon-Tyne, England, assignor to C. A. Parson & Company Limited, Newcastle-upon-Tyne, England
Filed June 28, 1955, Ser. No. 518,579
Claims priority, application Great Britain July 1, 1954
1 Claim. (Cl. 88—14)

This invention relates to spectrometers of the kind in which a plane diffraction grating is used for the production of spectra.

The invention is particularly, though not exclusively, applicable to infra-red spectrometers.

In such spectrometers parallel radiation is caused to fall on a plane ruled grating, which may either be an original or a replica, where it suffers diffraction. Some of the rays diffracted will reinforce each other if the following equation is satisfied:

$d \sin i_1 + d \sin i_2 = n\lambda$, where $d$ is the spacing of the lines ruled on the grating
$i_1$ is the angle of incidence
$i_2$ is the angle of diffraction
$\lambda$ is the wavelength of the particular wavelength under consideration
and $n$ is an integer indicating the order of the spectrum.

This is frequently referred to as the grating equation.

FIGURE 1 of the accompanying diagrammatic drawings relates to the above equation.

In infra-red spectrometers a Littrow arrangement of a plane grating is commonly used and in this case the grating equation becomes:

$$2d \sin i = n\lambda$$

where $$i_1 = i_2 = i$$

If the grating is rotated at constant angular speed $$\frac{d\lambda}{dt} = \frac{di}{dt}$$

and is constant, provided that $i$ is small, and a close approximation to a linear wavelength scale is obtained. However, $i$ frequently assumes quite large values, 45° or more, and then the error involved in replacing sin $i$ by $i$ is considerable.

The object of the present invention is to provide a means whereby the grating can be rotated by means, such as a screw, in such a way that a linear relation is obtained between wavelength and the number of turns of the screw. By suitably calibrating the screw or using a micrometer screw it is possible to make the screw reading indicate the wavelength directly in microns by giving the device suitable proportions.

The invention consists in means for imparting rotary motion to a plane ruled diffraction grating in a spectrometer about an axis parallel to the rulings, said rulings being perpendicular to the direction of the incident radiation, which means comprise a lever rigidly attached to the grating for the purpose of imparting rotary motion thereto, and means for applying a force, the line of direction of which always passes through a fixed point on the lever, in such a way that the displacement of the projection of said point, in a plane perpendicular to the rulings, toward an arbitrary line, in said plane, is proportional to the displacement of an actuating member applying said force directly or indirectly to the lever, an evenly divided scale being provided to indicate directly the movement of the actuating member, said arbitrary line passing through the axis of rotation of the grating and making an angle with a line in the same plane passing through the projection of the fixed point on the lever and the axis of rotation of the grating which angle is arranged so that in all cases it is equal to the sum of the angle of incidence and half the difference between the angle of diffraction and angle of incidence of radiations falling on the grating.

The invention also consists in means for imparting rotary motion ot a plane ruled diffraction grating about an axis parallel to the rulings substantially as described below with reference to the accompanying diagrammatic drawings in which:

FIGURE 1 shows the paths of the incident radiations and of the diffracted radiations.

FIGURES 2–4 show various ways of carrying out the invention.

One form of the apparatus embodying the present invention is illustrated in FIGURE 2 in which a lever AB is attached rigidly to a plane diffraction grating G at A. The lever is maintained in contact at its other end B with an attachment P on a micrometer screw M by means of spring S. The attachment P provides a flat surface at right angles to the axis of the screw on which the spherical end of lever AB may slide or rotate. As an alternative to a spherical end as shown, the end of the lever may be cylindrical or may incorporate a roller.

To obtain an accurately linear scale in those cases where the angle of incidence of the radiation is equal to the angle of diffraction as in a Littrow arrangement, it is necessary to make the angle BAH equal to the angle of incidence of the impinging radiation on the grating, where AH is at right angles to the axis of the micrometer screw M. If these angles are equal for one setting of the grating they will of course remain equal for all other settings provided that the grating is mounted as shown, that is to say, the mounting is such that the angle of incidence and the angle BAH increase or decrease together as the grating rotates.

Suppose at wavelength $\lambda$ (microns) the angle of incidence is $i$, while for the wavelength $\lambda+1$ the angle is increased to $i+\alpha$ and the micrometer setting is increased by an amount $h$, then since for the first order $$\sin i = \frac{\lambda}{2d} = \frac{BH}{AB}$$

and $$\sin (i+\alpha) = \frac{\lambda+1}{2d} = \frac{BH+h}{AB}$$

$$\frac{1}{2d} = \frac{h}{AB}$$

Thus if $h=0.1''$ on the micrometer, then 0.1″ will always represent the same wavelength interval for any setting of the grating, and if, in addition, AB (inches) $=0.2d$ (microns), 0.1″ will exactly represent 1 micron in the first order, 0.5 micron in the second order, etc. As an example, if the grating has 2400 lines to the inch, $d=10.583$ microns and $AB=2.1167''$.

By the length AB in the above equation we mean for the configuration shown in FIGURE 2 the length along the lever measured between the point A on the lever about which the grating rotates and the centre of the end of the lever.

FIGURE 3 illustrates an alternative way of carrying out the invention in which ABCD is a parallelogram formed from rigid hinged members AB, BC, CD and DA, this latter member being fixed in position. Thus when angle DAB is varied, BC is always parallel to AD. G is the grating which is mounted so that it is rigidly connected to AB, the centre of rotation of the grating face being at A. The member AD is not actually required since A and D are fixed pivots mounted on the base of the spectrometer. To the member BC is rigidly attached a crosspiece EF at right angles to it and the crosspiece bears on the end of a micrometer screw M, preferably provided with a ball end (not shown).

A spring S is provided to maintain contact between EF and the micrometer screw.

As before the angle BAH is made equal to the angle of incidence and AB in inches is made numerically equal to 0.2d microns with the result that 0.1" exactly represents 1 micron in the first order, 0.5 microns in the second order, etc.

FIGURE 4 illustrates an alternative way of communicating the micrometer movement to the member BC of FIGURE 3. The crosspiece EF carries a suitably mounted roller J arranged so that the roller bears on the surface of a flat disc P carried by the micrometer screw M which has its axis parallel to BC. The surface of the disc is accurately at right angles to the axis of the micrometer screw and is large enough to allow for the sideways movement of the roller as the screw is rotated.

The end of the crosspiece could of course, be spherical.

For the more general case where angles of incidence and diffraction are different, we can write $$d(\sin i_1 + \sin (i_1+\delta)) = n\lambda$$

where $\delta$ is equal to $i_2 - i_1$ and is constant for a given spectrometer.

Now $\sin i_1 + \sin (i_1+\delta) = 2 \sin \left(i_1+\frac{\delta}{2}\right) \cdot \cos \frac{\delta}{2} = \frac{n}{d}\lambda$ and again as in the configuration of both FIGURES 2 and 3 an exact linear scale can be obtained if angle BAH is made equal to $$i_1+\frac{\delta}{2}$$

and if AB is made numerically equal to $2d.h \cos \delta/2$ then a difference in micrometer reading "$h$" will correspond to a wavelength difference of 1 micron. For example if $h=0.1"$ and is to represent 1 micron, then length of AB in inches must be equal to $0.2d \cos \delta/2$. As before 0.1" on the micrometer will represent 0.5 micron in the second order, etc.

In all the above quoted examples of invention it has been assumed that the lever, the micrometer screw and the incident radiation all lie in the same plane, that is to say, in a plane at right angles to the rulings on the grating.

In the event of the micrometer screw and lever being in different planes, however, the equations still hold provided that the angles used are referred to the projections of the axis of rotation of the micrometer screw or lever or both in a plane at right angles to the rulings on the grating. Similarly for the equations quoting the length of the actuating lever the length of the projection of the actuating lever in a plane at right angles to the rulings on the grating must be substituted.

If the axis of the micrometer screw makes an angle with the plane at right angles to the rulings on the grating, the appropriate equation relating to the length of lever arm or projection thereof 'AB in the plane at right angles to the rulings is $$AB = 2dh \cdot \sec \phi \cos \frac{\delta}{2}$$

for the case when the micrometer screw has the attachment at right angles to its axis and this attachment is in contact with the lever or the lever actuating means as in FIGURES 2 and 4 respecively.

In the case of the configuration shown in FIGURE 3 however the length AB becomes $$2dh \cdot \cos \phi \cos \frac{\delta}{2}$$

I claim:

Means for imparting rotary motion to a plane ruled diffraction grating of a spectrometer having a stationary collimator and observing means, said rotary motion being about an axis parallel to the direction of the rulings on the grating and imparted to the gating by means of a lever rigidly fixedly to the grating, the said lever being engaged by actuating means comprising an actuating member which member is in operative relation with the said lever, in which arrangement that part of said lever arm in said operative relation with the actuating means has a circular profile, the arrangement being such that, in a reference plane perpendicular to the axis of rotation of the grating, a line passing through the centre of said circular profile and the axis of rotation of the grating makes an angle with a line, in said reference plane, perpendicular to the direction of motion of that part of the actuating means in contact with the said lever which angle is equal to the arithmetic mean between the angles of incidence and diffraction for the radiations impinging on said grating, and such that the displacement of the centre of said circular profile along a line parallel to the projection in the reference plane of the line of motion of that part of the actuating means in operative relation with the end of said lever is proportional to the displacement of the actuating member which is evenly graduated so that a direct wavelength indication can be obtained, the actuating member being a screw and the distance between the axis of rotation of the grating and the centre of the circular profile at the end of the lever in contact with the actuating means being numerically equal to a value $2dh \cos \delta/2 \sec \phi \sec \beta$ where $d$ is the spacing of the lines ruled on the grating in microns, $\delta$ is equal to the difference between the angle of diffraction and the angle of incidence of the radiations falling on the grating, $h$ is the movement of the actuating member in the direction of its axis of rotation corresponding to a wavelength difference of 1 micron, $\phi$ is the angle which the axis of rotation of the screw makes with a plane at right angles to the rulings on the grating and $\beta$ is the angle which the line joining the centre of rotation of the grating and the centre of the circular profile at the other end of said lever with the same plane.

References Cited in the file of this patent

UNITED STATES PATENTS

| | | |
|---|---|---|
| 2,670,648 | Miller et al. | Mar. 2, 1954 |
| 2,670,652 | Sherman | Mar. 2, 1954 |
| 2,706,253 | Hutchins et al. | Apr. 12, 1955 |

OTHER REFERENCES

Fastie: "A Small Plane Grating Monochromator" pages 641–647, Journal of the Optical Society of America, vol. 42, No. 9, September, 1952, page 644 especially cited.

Badger et al.: "A Vacuum Spectograph for the Infra-Red," The Review of Scientific Instruments, vol. 19, No. 12, December 1948, pages 861–865.

"An Efficient Grating Mount," by Finkelstein, in Journal of the Optical Society of America, pages 179–182. Vol. 41, No. 3, March 1951.